United States Patent
Chen et al.

(10) Patent No.: US 10,025,598 B2
(45) Date of Patent: Jul. 17, 2018

(54) STORAGE DEVICE, BOOTING PROCEDURE ACCELERATION METHOD AND STORAGE CONTROLLER

(71) Applicant: REALTEK SEMICONDUCTOR CORPORATION, Hsinchu (TW)

(72) Inventors: Cheng-Yu Chen, New Taipei (TW); Wang-Sheng Lin, New Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 109 days.

(21) Appl. No.: 15/217,831

(22) Filed: Jul. 22, 2016

(65) Prior Publication Data

US 2017/0046169 A1 Feb. 16, 2017

(30) Foreign Application Priority Data

Aug. 13, 2015 (TW) .............................. 104126310 A (51) Int. Cl.
*G06F 9/44* (2018.01)
*G06F 9/4401* (2018.01)

(52) U.S. Cl.
CPC .................. *G06F 9/4406* (2013.01)

(58) Field of Classification Search
None
See application file for complete search history.

(56) References Cited

U.S. PATENT DOCUMENTS

| 6,968,450 B1 * | 11/2005 | Rothberg | G06F 3/0607 711/113 |
| 9,542,318 B2 * | 1/2017 | Goldberg | G06F 12/121 |
| 2003/0163681 A1 * | 8/2003 | Mann | G06F 9/4406 713/2 |
| 2007/0038850 A1 * | 2/2007 | Matthews | G06F 9/4401 713/1 |
| 2008/0082812 A1 * | 4/2008 | Kirshenbaum | G06F 9/4401 713/2 |
| 2010/0017591 A1 * | 1/2010 | Smith | G06F 9/4406 713/2 |

* cited by examiner

*Primary Examiner* — Fahmida Rahman
(74) *Attorney, Agent, or Firm* — WPAT, PC (57) ABSTRACT

The present disclosure provides a storage device for accelerating a booting procedure. The storage device includes a non-volatile storage medium, a volatile cache memory and a storage controller. The non-volatile storage medium stores booting data and is configured to output the booting data according to a read instruction. The storage controller is configured to store the booting data to the volatile cache memory by executing the following steps: reading a booting data table including non-physical addresses of the booting data; generating a read instruction according to the booting data table, in which the read instruction indicates the physical addresses of the booting data in the non-volatile storage medium; storing the booting data from the non-volatile storage medium to the volatile cache memory; and associating the non-physical addresses of the booting data with the cache addresses of the booting data in the volatile cache memory.

15 Claims, 8 Drawing Sheets

STORAGE DEVICE, BOOTING PROCEDURE ACCELERATION METHOD AND STORAGE CONTROLLER

BACKGROUND OF THE INVENTION

1. Field of the Invention

The present disclosure relates to improvements in a booting procedure, especially to a storage device, a method for accelerating a booting procedure, and a storage controller.

2. Description of Related Art

As electronic devices are widely spread, end users obviously look forward to devices ready for immediate use. Industries in this field generally respond to such demand in the manner of accelerating the speed of data access.

A computer system is taken for an example. The bottleneck of the computer system's immediate use function is start-up operation, reboot operation, preparation of a user control mode, or the like. In detail, before shutdown or entering a low power standby mode, the computer system turns off most of its devices and keeps booting data in a storage device. Before start-up, reboot or entering the user control mode, the computer system reads out the booting data stored in the storage device to make itself ready for use. Accordingly, the procedures of the start-up, reboot or preparation of the user control mode need a lot of efforts to relocate the booting data for allowing a user to use the computer system immediately. Therefore, if the time (hereafter, booting time) necessary for the said procedures is too long, user experience of immediate use is unpleasant. There are several ways to reduce the booting time. One is to simplify the initialization procedures for the devices in a basic input/output system (BIOS) requiring initialization. One is to adopt a uniform driving procedure to reduce the waiting time caused by exceptional operation in running an operating system. And one is to use a flash memory storage device instead of a mechanical hard drive.

However, in consideration of that the data addressing manners for a computer system and for a storage device are different, a data access instruction from the computer system is required to be translated by a storage device controller before the data corresponding to the instruction in the storage device is accessed. The time for the above-mentioned access process is the responding time of data access operation, and the responding time occupies a considerable portion of the booting time. Unfortunately, the current arts aiming at the acceleration of booting procedure do not take the responding time seriously.

SUMMARY OF THE INVENTION

In consideration of the problems of prior arts, an object of the present disclosure is to provide a storage device, a booting procedure acceleration method and a storage controller for making improvements over the prior arts.

The present disclosure discloses a storage device. An embodiment of the storage device comprises a non-volatile storage medium, a volatile cache memory and a storage controller. The non-volatile storage medium is configured to store booting data and output the booting data according to a booting data read instruction. The storage controller is configured to store the booting data to the volatile cache memory by executing at least the following steps: reading a booting data table including non-physical addresses of the booting data; generating the booting data read instruction according to the booting data table, in which the booting data read instruction indicates physical addresses of the booting data in the non-volatile storage medium; storing the booting data outputted from the non-volatile storage medium to the volatile cache memory; and associating the non-physical addresses of the booting data with cache addresses of the booting data in the volatile cache memory.

The present disclosure also discloses a storage controller configured to store booting data in a volatile cache memory by executing at least the following steps: reading a booting data table including non-physical addresses of the booting data; generating a booting data read instruction according to the booting data table, in which the booting data read instruction indicates physical addresses of the booting data in a non-volatile storage medium; reading the booting data from the non-volatile storage medium according to the booting data read instruction and then storing the booting data to the volatile cache memory; and associating the non-physical addresses of the booting data with cache addresses of the booting data in the volatile cache memory.

In some embodiments, the step of generating the booting data read instruction includes: looking an address mapping table up according to the booting data table to generate the booting data read instruction; or executing address mapping calculation according to the booting data table to generate the booting data read instruction.

The present disclosure further discloses a booting procedure acceleration method. An embodiment of the method comprises the following steps: after the start-up of a host, executing a device initialization procedure; reading a booting data table including non-physical addresses of booting data; generating a booting data read instruction according to the booting data table, in which the booting data read instruction indicates physical addresses of the booting data in a non-volatile storage medium; reading the booting data from the non-volatile storage medium according to the booting data read instruction and storing the booting data in a volatile cache memory; and associating the non-physical addresses of the booting data with cache addresses of the booting data in the volatile cache memory.

These and other objectives of the present disclosure no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this industrial field. If any term is defined in this specification, such term should be explained accordingly.

The present disclosure includes a device, a method and a system capable of accelerating a booting procedure which can be interpreted as, but not limited to, a warm-start procedure, a cold-start procedure, a reset/reboot procedure, etc., and applicable to a desktop or portable electronic host. On account of that some elements of the device and system in the present disclosure could be known, the details of such elements are omitted provided that this omission has little to do with the written description and enablement requirements. In addition, the method of the present disclosure can be in the form of firmware and/or software which could be carried out by the device or controller of the present disclosure or the equivalent device thereof.

Generally speaking, a conventional booting procedure of a host includes the following steps: receiving supplied power; initializing host internal circuits; initializing a basic input/output system (BIOS) and examining hardware; finishing the initialization of a storage device which is then logically connected with the host; loading an operating system to the host and sending a host instruction to the storage device for requesting booting data; and executing address conversion according to the host instruction and sending the booting data to the host from the storage device. Accordingly, the booting data is prepared and provided after the host requests the storage device to do so. However, in the present disclosure, the booting data is stored in a volatile cache memory during the procedure of BIOS initialization and hardware examination, such that the booting data could be rapidly provided from the cache memory in response to the request of the host, in which the request of the host is to ask for the booting data. Accordingly, the booting procedure could be accelerated.

Figure 2:
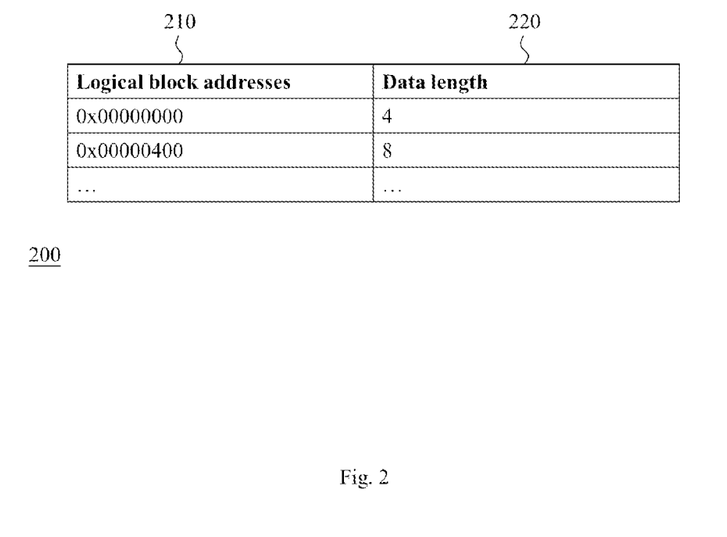
FIG. 2 illustrates an example of the booting data table according to one embodiment of the present disclosure.

A computer system is taken as an example for more details. A general computer system ascertains the addresses of data in a storage device (e.g., solid state drive, SSD) through logical block addresses (LBA), in which the storage device includes a non-volatile storage medium. In consideration of that different non-volatile storage mediums may be associated with different limits of read/write times and different addressing manners, the storage device is usually configured to carry out specific address calculation in accordance with the type and manufacturing process of its own non-volatile storage medium, and thus the storage device has to do address conversion before executing data access according to the LBA, such that the LBA recognized by the computer system could be converted into physical addresses of data in the storage device. However, if address conversion is executed for data access every time (while some data may be accessed frequently), the performance of data access will be deteriorated. In order to solve this kind of problem, the relationship between physical addresses and LBA is stored in a physical to logical address mapping table, so the storage device does not have to rebuild the address relationship for each data access operation and consequently prevents the waste of time. It should be noted that the mapping table is updated in accordance with the operation of the computer system and the change of hardware/software. The storage device of the present disclosure is capable of loading booting data to a cache memory according to an address mapping table (e.g., the aforementioned physical to logical address mapping table) and a booting data table in advance, in which the booting data table describes the content of the booting data as shown in FIG. 2.

In general, there are many ways to establish a booting data table. Some of them are listed below:

(1) Establishing a booting data table by software: A host or a storage device can establish a booting data table by executing an application program or a driver program of the storage device. More specifically, at the time when operating system of the host is initiated, the host or the storage device can record a plurality of former input and output operations of the host based on the Least Recently Used (LRU) algorithm or the like through the software program, so as to establish and/or update the booting data table.

(2) Establishing a booting data table by firmware: A storage device can establish a booting data table by firmware. More specifically, at the time when the operating system of a host is initiated, the storage device can record a plurality of former input and output operations of the host based on the LRU algorithm or the like through the firmware, so as to establish and/or update the booting data table.

(3) Establishing a booting data table manually: A user can establish a booting data table directly according to system characteristics or requirements.

Figure 1:
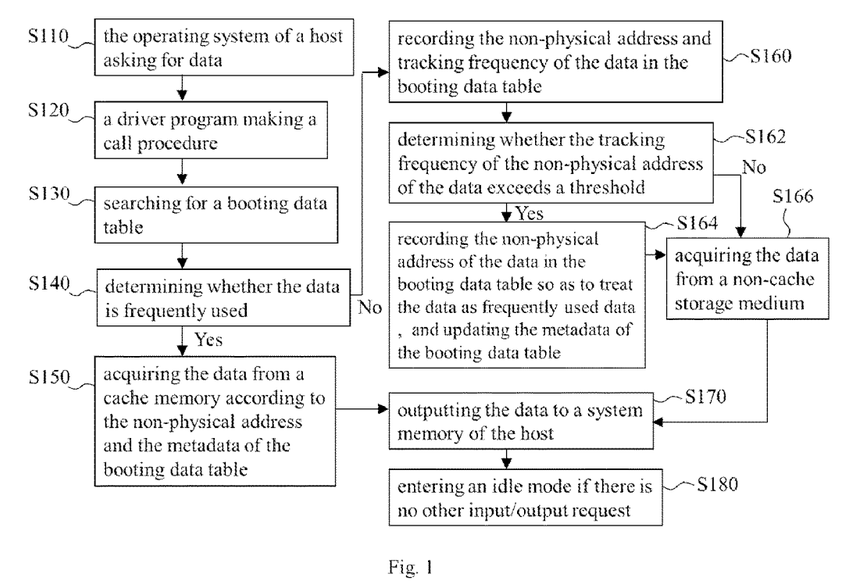
FIG. 1 illustrates a flow chart for establishing a booting data table according to one embodiment of the present disclosure.

A non-restrictive embodiment of the procedure for updating a booting data table is illustrated in FIG. 1, including the following steps:

Step S110: the operating system of a host asking for data.

Step S120: a driver program (e.g., a driver program of rapid storage technology) making a call procedure.

Step S130: searching for a booting data table.

Step S140: determining whether the data is frequently used according to the non-physical address of the data, going to step S150 if the determination result is positive (i.e., data is frequently used), and going to step S160 if the determination result is negative.

Step S150: acquiring the data from a cache memory according to the non-physical address and the metadata of the booting data table, recording or updating a tracking frequency in the booting data table while the tracking frequency is associated with the non-physical address of the data.

Step S160: recording the non-physical address and tracking frequency of the data in the booting data table.

Step S162: determining whether the tracking frequency of the non-physical address of the data exceeds a threshold, going to step S164 if the determination result is positive (i.e., the threshold is exceeded), and going to step S166 if the determination result is negative.

Step S164: recording the non-physical address of the data in the booting data table so as to treat the data as frequently used data, and updating the metadata of the booting data table accordingly.

Step S166: acquiring the data from a non-cache storage medium.

Step S170: outputting the data to a system memory of the host by a direct memory access controller.

Step S180: entering an idle mode if there is no other input/output request.

Normally speaking, the booting data table 200 as shown in FIG. 2 includes at least information of logical block addresses 210 and data lengths 220. Of course the booting data table 200 may further include the parameter(s) such as a hit ratio derived from the LRU algorithm or other algorithms. It should be noted that, in the present disclosure, although the booting data can be loaded in advance according to a booting data table and an address mapping table (e.g., the aforementioned physical to logical address mapping table), the source, format, content, etc. of the address mapping table and the booting data table are not limited to specific manners.

Figure 3:
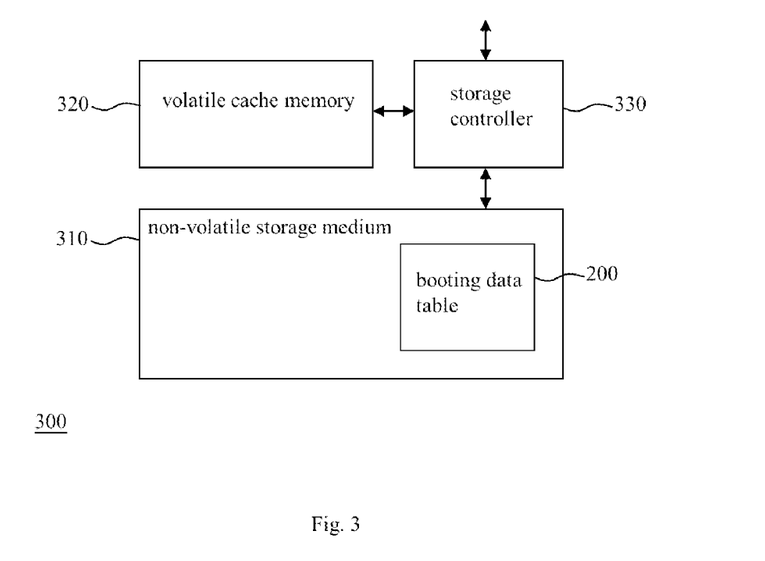
FIG. 3 illustrates a storage device according to one embodiment of the present disclosure.

Reference is made to FIG. 3, an embodiment of the storage device of the present disclosure is illustrated. As shown in FIG. 3, the storage device 300 includes a non-volatile storage medium 310, a volatile cache memory 320 and a storage controller 330.

The non-volatile storage medium 310 stores booting data and is operable to output the booting data according to a booting data read instruction. For instance, if the non-volatile storage medium 310 is a flash memory, the storage controller 330 is operable to send the booting data read instruction to the non-volatile storage medium 310 (i.e., the flash memory), so as to read the booting data by the addressing manner of the flash memory; if the non-volatile storage medium 310 is storage sectors of a mechanical hard drive, the storage controller 330 is operable to send the booting data read instruction to the mechanical hard drive, so as to read the booting data according to the addressing manner of cylinders-heads-sectors (CHS).

The volatile cache memory 320 could be a dynamic or static random access memory (DRAM or SRAM), which can be built in the storage device 300 or independent of the storage device 300. When the volatile cache memory 320 is independent of the storage device 300, the storage device 300 may have the control over the volatile cache memory 320 through a protocol or a driver program.

The storage controller 330 and the non-volatile storage medium 310 usually pertain to the same storage device 300 such as a solid state drive, a mechanical hard drive, a hybrid drive or an optical storage device. In some embodiments, the storage controller 330 and the non-volatile storage medium 310 are distinct devices in a system such as a network attached storage (NAS) system.

Figure 4:
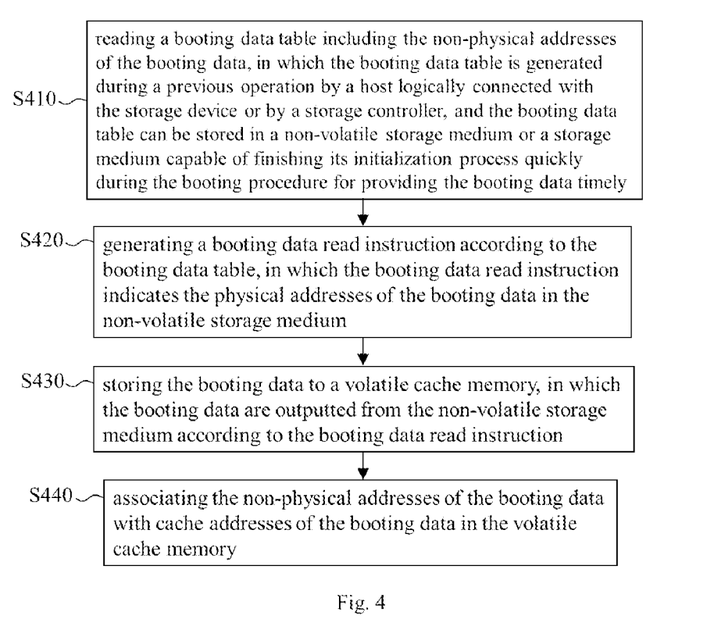
FIG. 4 illustrates an embodiment of steps carried out by the storage controller in FIG. 3.

The storage controller 330 can access the booting data in the non-volatile storage medium 310 and then store the booting data to the volatile cache memory 320 by carrying out the following steps as shown in FIG. 4:

Step S410: reading a booting data table 200 including the non-physical addresses (e.g., LBA) of the booting data, in which the booting data table is generated during a previous operation (that is to say, an operation prior to the current booting procedure) by a host logically connected with the storage device 300 or by the storage controller 330, and the booting data table can be stored in the non-volatile storage medium 310 or a storage medium capable of finishing its initialization process quickly during the booting procedure for providing the booting data timely.

Step S420: generating a booting data read instruction according to the booting data table 200, in which the booting data read instruction indicates the physical addresses of the booting data in the non-volatile storage medium 310. For instance, this step can generate the booting data read instruction by the following manners: generating the booting data read instruction by looking up an address mapping table (e.g., a physical to logical address mapping table) according to the booting data table, or by generating the booting data read instruction by executing address conversion (e.g., physical to logical address conversion).

Step S430: storing the booting data to the volatile cache memory 320, in which the booting data are outputted from the non-volatile storage medium 310 according to the booting data read instruction.

Step S440: associating the non-physical addresses of the booting data with cache addresses of the booting data in the volatile cache memory 320.

Figure 5:
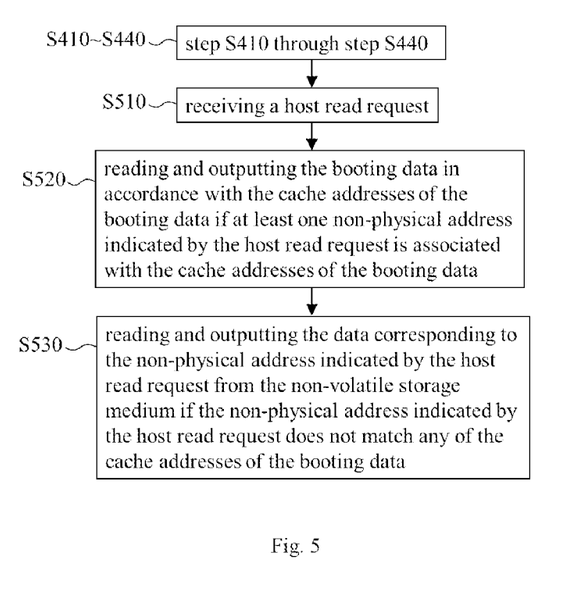
FIG. 5 illustrates another embodiment of steps carried out by the storage controller in FIG. 3.

Based on the above steps, after storing the booting data to the cache memory 320, the storage controller 330 can provide the booting data or other data in response to the request from the host. More specifically, as shown in FIG. 5, the storage controller 330 may further execute the following steps:

Step S510: receiving a host read request after finishing step S440.

Step S520: determining whether at least one non-physical address indicated by the host read request is associated with the cache addresses of the booting data, and reading and outputting the booting data in accordance with the cache addresses of the booting data if the determination result is positive (that is to say, the association exists).

Step S530: reading and outputting the data corresponding to the non-physical address indicated by the host read request from the non-volatile storage medium 310 if the non-physical address indicated by the host read request does not match any of the cache addresses of the booting data. To be more specific, an embodiment of step S530 includes the following sub-steps: generating a data read instruction according to the non-physical address indicated by the host read request, in which the data read instruction indicates at least a physical address of the non-volatile storage medium 310; storing storage data associated with the at least one physical address of the non-volatile storage medium 310 to the volatile cache memory 320; outputting the storage data; and associating the non-physical address indicated by the host read request with the cache address of the storage data in the volatile cache memory 320.

Figure 6:
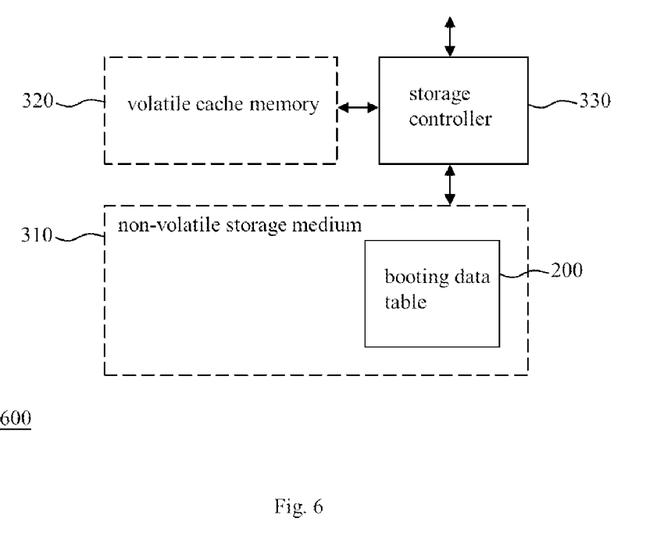
FIG. 6 illustrates a storage controller according to one embodiment of the present disclosure.

Reference is made to FIG. 6. An embodiment of the storage controller of the present disclosure is illustrated. Compared to the embodiment of FIG. 3, the embodiment in FIG. 6 includes the storage controller 330 but does not include the non-volatile storage medium 310 and the volatile cache memory 330 (which are therefore illustrated in dotted lines in FIG. 6). The storage controller 330 can carry out the aforementioned steps S410-S440 and selectively carry out the steps S510-S530. The related description is found in the preceding paragraphs.

Figure 7:
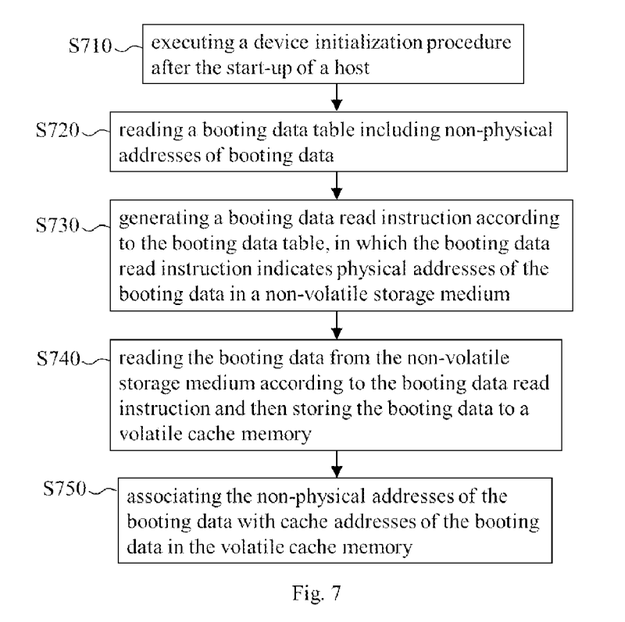
FIG. 7 illustrates a booting procedure acceleration method according to one embodiment of the present disclosure.

In addition to the aforementioned device, the present disclosure also discloses a booting procedure acceleration method which can be carried out by the storage controller 330 or the equivalent thereof. An embodiment of the method is illustrated in FIG. 7, and includes the following steps:

Step S710: executing a device initialization procedure after the startup of a host (e.g., after power is supplied to the host or the host is rebooted).

Step S720: reading a booting data table including non-physical addresses of booting data after finishing the device initialization procedure, in which the booting data table can be stored in the fore-disclosed non-volatile storage medium 310.

Step S730: generating a booting data read instruction according to the booting data table, in which the booting data read instruction indicates physical addresses of the booting data in a non-volatile storage medium. This step can generate the booting data read instruction through the following manners: generating the booting data read instruction by looking up an address mapping table in accordance with the booting data table, or generating the booting data read instruction by executing address conversion according to the booting data table.

Step S740: reading the booting data from the non-volatile storage medium according to the booting data read instruction and then storing the booting data to a volatile cache memory.

Step S750: associating the non-physical addresses of the booting data with cache addresses of the booting data in the volatile cache memory.

Figure 8:
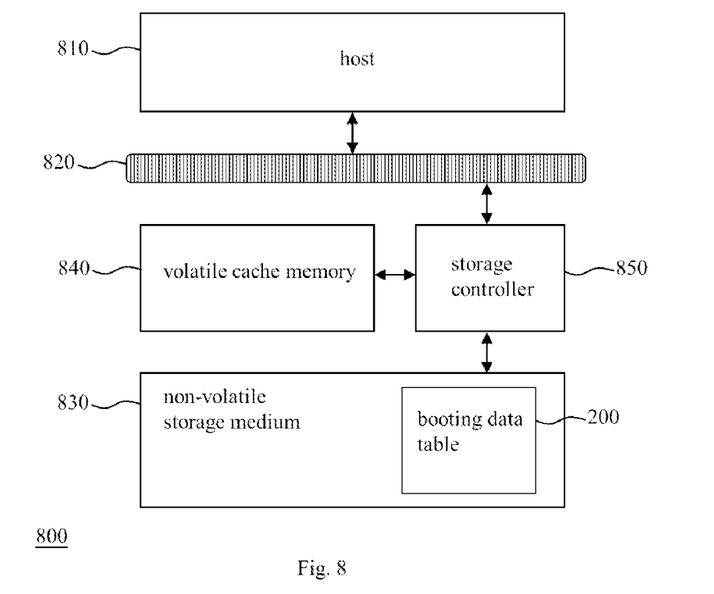
FIG. 8 illustrates a booting procedure accelerating system according to one embodiment of the present disclosure.

The present disclosure further discloses a booting procedure accelerating system. An embodiment of the system is illustrated in FIG. 8, and the system 800 in FIG. 8 includes a host 810, a transmission interface 820, a non-volatile storage medium 830, a volatile cache memory 840 and a storage controller 850.

The host 810 is a device capable of running an operating system and operable to send a host read request after start up. The transmission interface 820 is coupled with the host 810 and operable to forward the host read request and booting data, and includes circuits necessary for transmission. The non-volatile storage medium 830 could be the fore-disclosed non-volatile storage medium 310, stores the booting data, and is operable to output the booting data in response to a booting data read instruction before receiving the host read request. The storage controller 850, e.g., the fore-disclosed storage controller 330, is coupled to the transmission interface 820 and operable to output the booting data to the host 810 through the transmission interface 820 by executing the following steps: reading the booting data table 200; generating the booting data read instruction according to the booting data table 200, in which the booting data read instruction indicates physical addresses of the booting data in the non-volatile storage medium 830; reading the booting data from the non-volatile storage medium 830 according to the booting data read instruction and then storing the booting data to the volatile cache memory 840; associating the non-physical addresses of the booting data with cache addresses of the booting data in the volatile cache memory 840 while this step and the above-mentioned steps are executed before receiving the host read request; and outputting at least a part of the booting data in the volatile cache memory 840 to the host 810 according to the non-physical address indicated by the host read request. In some embodiments, before the host 810 finished in loading an operating system, the storage controller 850 finishes storing the booting data from the non-volatile storage medium 830 to the volatile cache memory 840.

Similar to those described above, the storage controller 850 can further execute the following steps: determining whether at least one non-physical address indicated by the host read request is associated with the cache addresses of the booting data; and reading and outputting the data corresponding to the non-registered address from the non-volatile storage medium 830 if a non-registered address among the non-physical address(es) indicated by the host read request is not associated with the cache address of the booting data. An embodiment of the step of reading and outputting the data corresponding to the non-registered address includes: generating a data read instruction according to the non-registered address, in which the data read instruction indicates at least a physical address of the non-volatile storage medium 830; storing storage data associated with the at least one physical address of the non-volatile storage medium 830 to the volatile cache memory 840; outputting the storage data from the volatile cache memory 840 to the host 810; and associating the non-registered address with the cache address of the storage data in the volatile cache memory 840.

In summary, the device, method and system of the present disclosure can accelerate a booting procedure, prevent the slow the start-up speed by lowering the response time of data access operation, and have the features of low implementation cost and high adaptability.

The aforementioned descriptions represent merely the preferred embodiments of the present disclosure, without any intention to limit the scope of the present invention thereto. Various equivalent changes, alterations, or modifications based on the claims of present disclosure are all consequently viewed as being embraced by the scope of the present disclosure.

What is claimed is:

1. A storage device, comprising:
a non-volatile storage medium configured to store booting data of a host device and output the booting data according to a booting data read instruction;
a volatile cache memory; and
a storage controller configured to store the booting data to the volatile cache memory by executing at least the following steps during a procedure of BIOS initialization and hardware examination of the host device and before receiving a host read request from the host device for the booting data:
reading a booting data table including non-physical addresses of the booting data;
generating the booting data read instruction according to the booting data table, in which the booting data read instruction indicates physical addresses of the booting data in the non-volatile storage medium;
storing the booting data outputted from the non-volatile storage medium to the volatile cache memory; and
associating the non-physical addresses of the booting data with cache addresses of the booting data in the volatile cache memory;
wherein after receiving the host read request, the storage controller is configured to provide the booting data from the cache memory to the host device based on the associated cache addresses, and the host device is booted with the booting data.

2. The storage device of claim 1, wherein the storage controller is configured to further execute the following steps:
receiving the host read request after associating the non-physical addresses of the booting data with the cache addresses of the booting data in the volatile cache memory;
reading and outputting at least a part of the booting data according to the cache addresses of the booting data if a non-physical address indicated by the host read request is associated with the cache addresses of the booting data; and
reading and outputting data from the non-volatile storage medium according to the non-physical address indicated by the host read request if the non-physical address indicated by the host read request is not associated with the cache addresses of the booting data.

3. The storage device of claim 2, wherein the step of reading and outputting the data from the non-volatile storage medium according to the non-physical address indicated by the host read request comprises:
generating a data read instruction according to the non-physical address indicated by the host read request, in which the data read instruction indicates at least one physical address of the non-volatile storage medium;

storing storage data associated with the at least one physical address of the non-volatile storage medium to the volatile cache memory;

outputting the storage data; and associating the non-physical address indicated by the host read request with the cache address of the storage data in the volatile cache memory.

4. The storage device of claim 1, wherein the non-physical addresses of the booting data are logical block addresses.

5. The storage device of claim 1, wherein the storage device is a solid state drive (SSD).

6. The storage device of claim 1, wherein the booting data table is generated by the host device or the storage controller and stored in the non-volatile storage medium before the storage controller reads the booting data table.

7. A booting procedure acceleration method, comprising:

after the start-up of a host device, executing a device initialization procedure; and executing at least the following steps during a procedure of BIOS initialization and hardware examination of the host device and before receiving a host read request from the host device for the booting data:

reading a booting data table including non-physical addresses of booting data of the host device;

generating a booting data read instruction according to the booting data table, in which the booting data read instruction indicates physical addresses of the booting data in a non-volatile storage medium;

reading the booting data from the non-volatile storage medium according to the booting data read instruction and storing the booting data in a volatile cache memory; and associating the non-physical addresses of the booting data with cache addresses of the booting data in the volatile cache memory;

wherein after receiving the host read request, the storage controller is configured to provide the booting data from the cache memory to the host device based on the associated cache addresses, and the host device is booted with the booting data.

8. The booting procedure acceleration method of claim 7, further comprising:

receiving the host read request from the host after associating the non-physical addresses of the booting data with the cache addresses of the booting data in the volatile cache memory;

reading and outputting at least a part of the booting data according to the cache addresses of the booting data if a non-physical address indicated by the host read request is associated with the cache addresses of the booting data; and reading and outputting data from the non-volatile storage medium according to the non-physical address indicated by the host read request if the non-physical address indicated by the host read request is not associated with the cache addresses of the booting data.

9. The booting procedure acceleration method of claim 8, wherein the step of reading and outputting the data from the non-volatile storage medium according to the non-physical address indicated by the host read request comprises:

generating a data read instruction according to the non-physical address indicated by the host read request, in which the data read instruction indicates at least one physical address of the non-volatile storage medium;

storing storage data associated with the at least one physical address of the non-volatile storage medium to the volatile cache memory;

outputting the storage data; and associating the non-physical address indicated by the host read request with the cache address of the storage data in the volatile cache memory.

10. The booting procedure acceleration method of claim 7, wherein the non-physical addresses of the booting data are logical block addresses.

11. A storage device comprising a storage controller, configured to store booting data of a host device in a volatile cache memory by executing at least the following steps during a procedure of BIOS initialization and hardware examination of the host device and before receiving a host read request from the host device for the booting data:

reading a booting data table including non-physical addresses of the booting data;

generating a booting data read instruction according to the booting data table, in which the booting data read instruction indicates physical addresses of the booting data in a non-volatile storage medium;

reading the booting data from the non-volatile storage medium according to the booting data read instruction and then storing the booting data to the volatile cache memory; and associating the non-physical addresses of the booting data with cache addresses of the booting data in the volatile cache memory;

wherein after receiving the host read request, the storage controller is configured to provide the booting data from the cache memory to the host device based on the associated cache addresses, and the host device is booted with the booting data.

12. The storage controller of claim 11, configured to further execute the following steps:

receiving the host read request after associating the non-physical addresses of the booting data with the cache addresses of the booting data;

reading and outputting at least a part of the booting data according to the cache addresses of the booting data if a non-physical address indicated by the host read request is associated with the cache addresses of the booting data; and reading and outputting data from the non-volatile storage medium according to the non-physical address indicated by the host read request if the non-physical address indicated by the host read request is not associated with the cache addresses of the booting data.

13. The storage controller of claim 12, wherein the step of reading and outputting the data from the non-volatile storage medium according to the non-physical address indicated by the host read request comprises:

generating a data read instruction according to the non-physical address indicated by the host read request, in which the data read instruction indicates at least one physical address of the non-volatile storage medium;

storing storage data associated with the at least one physical address of the non-volatile storage medium to the volatile cache memory;

outputting the storage data; and associating the non-physical address indicated by the host read request with the cache address of the storage data in the volatile cache memory.

14. The storage controller of claim 11, wherein the non-physical addresses of the booting data are logical block addresses.

15. The storage controller of claim 11, wherein the booting data table is generated by the host device or the storage controller before the storage controller reads the booting data table.

* * * * *